(12) United States Patent
Jin et al.

(10) Patent No.: US 8,618,232 B2
(45) Date of Patent: Dec. 31, 2013

(54) INFRARED ABSORBING THIN FILM CONTAINING RUTILE-TYPE TITANIUM OXIDE CRYSTAL AND METHOD FOR PRODUCING THE SAME

(75) Inventors: Ren-Hua Jin, Sakura (JP); Pei-Xin Zhu, Sakura (JP)

(73) Assignees: DIC Corporation, Tokyo (JP); Kawamura Institute of Chemical Research, Sakura-shi (JP)

( * ) Notice: Subject to any disclaimer, the term of this patent is extended or adjusted under 35 U.S.C. 154(b) by 0 days.

(21) Appl. No.: 13/642,186

(22) PCT Filed: Mar. 31, 2011

(86) PCT No.: PCT/JP2011/058304
§ 371 (c)(1),
(2), (4) Date: Oct. 19, 2012

(87) PCT Pub. No.: WO2011/135974
PCT Pub. Date: Nov. 3, 2011

(65) Prior Publication Data
US 2013/0040129 A1 Feb. 14, 2013

(30) Foreign Application Priority Data
Apr. 26, 2010 (JP) ................................. 2010-100826

(51) Int. Cl.
| C08F 110/00 | (2006.01) |
| C09K 3/00 | (2006.01) |
| B05D 5/00 | (2006.01) |
| B32B 5/02 | (2006.01) |
| B82Y 30/00 | (2011.01) |

(52) U.S. Cl.
USPC .......... 526/348.1; 428/328; 427/160; 252/70; 977/773

(58) Field of Classification Search
USPC .......... 526/348.1; 428/328; 427/160; 252/70; 977/773
See application file for complete search history.

(56) References Cited

U.S. PATENT DOCUMENTS

| 2006/0204456 A1 | 9/2006 | Asakura |
| 2009/0196819 A1 | 8/2009 | Asakura |
| 2013/0040129 A1* | 2/2013 | Jin et al. .................. 428/328 |

FOREIGN PATENT DOCUMENTS

| JP | 2005-336420 A | 12/2005 |
| JP | 2007-238424 A | 9/2007 |
| WO | WO-2004/052786 A1 | 6/2004 |
| WO | WO-2008/072595 A1 | 6/2008 |

OTHER PUBLICATIONS

International Search Report dated May 31, 2011, issued for PCT/JP2011/058304.

* cited by examiner

*Primary Examiner* — William Cheung
(74) *Attorney, Agent, or Firm* — Edwards Wildman Palmer LLP (57) ABSTRACT

There are provided an infrared absorbing thin film that efficiently absorbs infrared rays and has good versatility by controlling the absorption intensity of titanium oxide in an infrared region and a method for producing the infrared absorbing thin film. The infrared absorbing thin film containing a rutile-type titanium oxide crystal.

19 Claims, 5 Drawing Sheets

INFRARED ABSORBING THIN FILM CONTAINING RUTILE-TYPE TITANIUM OXIDE CRYSTAL AND METHOD FOR PRODUCING THE SAME

TECHNICAL FIELD

The present invention relates to a thin film that contains a rutile-type titanium oxide crystal and can efficiently absorb infrared rays and a method for producing the thin film.

BACKGROUND ART

Materials that absorb infrared rays over the entire infrared wavelength range can effectively generate heat unlike typical infrared absorbing materials for infrared absorption sensors. Therefore, such materials are expected to be used as materials that convert infrared energy into thermal energy in the environmental and energy fields.

To generate heat by infrared absorption, it is desirable that light be absorbed over the entire infrared wavelength range, for example, at all wavelengths of near-infrared rays, mid-infrared rays, and far-infrared rays. To use the generated heat as a heat source, it is desirable that an infrared absorbing material itself have heat resistance. Only infrared absorbing materials composed of an inorganic material can satisfy both the conditions described above. However, typical inorganic materials cannot absorb light at all wavelengths of infrared rays. A material that transmits infrared rays in a specific narrow wavelength range has been known as a material that can absorb infrared rays. For example, it has been described that, by using a manganese oxide-based nano-porous crystal, infrared rays having particular wavelengths are transmitted and those having other wavelengths are absorbed (e.g., refer to PTL 1). However, such a method that uses a manganese oxide-based nano-porous crystal results in high production cost, and therefore has no versatility as an industrial method. In addition, it is unclear whether the material causing such infrared absorption would function as a heat-generating material.

The titanium oxide reserves in nature are larger than the reserves of noble metal oxides, and titanium oxide is a cheap material that is widely used in industries from those concerning general-purpose materials such as white pigment, photo-catalysts, and paint to those concerning special fields of application such as dye-sensitized solar cells and light-responsive materials. Titanium oxide itself slightly absorbs infrared rays at certain wavelengths in a short- and long-wavelength infra-red range, but does not absorb infrared rays in most of the wavelength range. However, it is believed that efficient absorption of infrared rays may be achieved by causing a certain amount of distortion on the crystal lattice structure of titanium oxide.

CITATION LIST

Patent Literature

PTL 1: Japanese Unexamined Patent Application Publication No. 2007-238424

SUMMARY OF INVENTION

Technical Problem

In view of the foregoing, an object of the present invention is to provide an infrared absorbing thin film that has good versatility and efficiently absorbs infrared rays by controlling the absorption intensity of titanium oxide in an infrared region and a method for producing the infrared absorbing thin film.

Solution to Problem

As a result of eager study for achieving the object above, the inventors of the present invention have found the following and completed the present invention. That is, when titanium oxide is doped with a trace amount of transition metal ion, the doped titanium oxide is caused to grow into a rutile-type crystal, and the thickness of the rutile-type crystal is decreased, the thin film can absorb infrared rays with wavelengths over the entire infrared range and furthermore the absorption causes generation of heat.

The present invention provides a method for producing an infrared absorbing thin film containing a rutile-type titanium oxide crystal doped with a transition metal ion, the method including:

a step (I) of dispersing or dissolving a complex (y) of an amino group-containing basic polymer (x) and a transition metal ion in an aqueous medium;

a step (II) of obtaining a composite having a polymer/titania layered structure in which the complex (y) of the amino group-containing basic polymer (x) and the transition metal ion is sandwiched between layers of titania with a distance of 1 to 3 nm, by mixing the aqueous dispersion or aqueous solution prepared in the step (I) with a water-soluble titanium compound (z) in the aqueous medium at a temperature of 50° C. or lower to cause a hydrolysis reaction;

a step (III) of calcining the composite having the layered structure in an air atmosphere at a temperature of 650° C. or higher to dope a surface of a titanium oxide crystal with the transition metal ion confined in the layered structure and simultaneously to cause growth into a rutile-type crystal phase;

a step (IV) of pulverizing the obtained crystal into a powder;

a step (V) of mixing the obtained powder with a sol of a metal alkoxide to prepare a fluid liquid composition;

a step (VI) of coating a surface of a substrate with the obtained fluid liquid composition; and a step (VII) of aging the coating film.

The present invention also provides an infrared absorbing thin film containing a rutile-type titanium oxide crystal that generates heat through infrared absorption.

Advantageous Effects of Invention

The thin film of the present invention that contains a rutile-type titanium oxide crystal doped with a transition metal ion can efficiently absorb infrared rays and convert the infrared energy into thermal energy. Thus, the thin film obtained in the present invention can be suitably industrially used as a photothermal conversion material that uses infrared rays.

DESCRIPTION OF EMBODIMENTS

Most transition metal oxides exhibit semiconductivity, and the lattice constant of the crystal structure thereof is a fixed value in most cases. However, if distortion is provided to the lattice constant, the electrical conductivity can be improved. Similarly, the distortion of a crystal lattice constant causes a change (defect) in the structure between crystal faces and the band concerning vibration in the crystal structure is broadened. Consequently, vibration over a wide range derived from unspecified structures preferentially occurs compared with vibration derived from specified structures. That is, a metal oxide having a distorted lattice constant absorbs infrared energy over a wide wavelength range and thus strong vibration is accelerated inside the crystal structure. As a result, vibration energy functions as a heat source.

In the present invention, attention is paid to a rutile-type titanium oxide crystal as a metal oxide. In titanium oxide crystals, an octahedral structure including a titanium atom in the center and six oxygen atoms coordinating to the titanium atom constitutes a crystal system. In the case of rutile-type titanium oxide crystals, the number of ridge lines shared between octahedrons is small compared with other crystal systems, and the crystal extends in the form of a chain while two ridge lines are shared. In the case of anatase-type titanium oxide crystals, the crystal extends while four ridge lines are shared. Therefore, the ionicity of a Ti—O bond in rutile-type titanium oxide crystals is larger than that in anatase-type crystals and doping of a rutile-type crystal with other metals is believed to significantly affect the distortion in the crystal structure and the characteristics of the Ti—O bond. To effectively perform doping with a metal, it is desirable to insert a metal ion into gaps between the nanostructures of titanium oxide and heat the titanium oxide in such a structural state to induce the formation and conversion of a titanium oxide crystal phase. In the process, the titanium oxide crystal structure is desirably doped with the metal ion.

The inventors of the present invention have disclosed that titanium oxide is doped with a metal by using a nano crystal and a layered structure of nanospaces (e.g., International Publication No. WO 2008/072595). This is a method in which a nano-layered structure including a metal complex in a nano-space between unit cells of titanium oxide is prepared and the titanium oxide crystal is doped with a metal ion confined in the nanospace.

The complex (y) of an amino group-containing basic polymer (x) and a transition metal ion functions as a catalyst for a hydrolytic condensation reaction of a water-soluble titanium compound (z). At the same time, the complex (y) forms an ion complex with a titania sol generated through the reaction while inducing deposition of the titania sol. As a result, a composite having a polymer-metal complex/titania layered structure in which the polymer and the titania are alternately stacked is produced.

By calcining the polymer metal complex/titania composite having a layered structure, the transition metal ion in the complex (y) of the amino group-containing basic polymer (x) and the transition metal ion, the complex (y) being present between the crystal layers of titania, causes a doping reaction at the surface of a titania crystal. As a result, a rutile-type titanium oxide crystal is obtained, and thus conversion into doped titanium oxide that can absorb infrared rays over an infrared wavelength range is achieved.

In the above-described production method, it is important to remove an organic component derived from the amino group-containing basic polymer (x). Therefore, the calcination needs to be performed in the presence of oxygen. That is, a carbon component and a nitrogen component derived from an organic component are removed in the form of carbon dioxide gas and nitrogen oxide gas, respectively, by performing calcination in the air atmosphere.

To increase the amount of infrared absorption of titanium oxide, the titanium oxide crystal needs to be a rutile-type titanium oxide crystal. To achieve this, the calcination temperature needs to be 650° C. or higher and is desirably set to be 650 to 1200° C. in terms of energy cost. The calcination temperature is preferably 750 to 950° C. to efficiently form a rutile-type crystal phase.

The calcination time can be suitably set in the range of 2 to 14 hours. In general, preferably, the temperature range and time can be suitably adjusted by preparing a temperature-increasing program in terms of energy cost and productivity.

The content of the transition metal ion in the rutile-type titanium oxide crystal is preferably 0.1 to 20% by mass. The content can be adjusted by controlling the content of the transition metal ion in the complex (y) of the amino group-containing basic polymer (x) and the transition metal ion at the preparation stage of the composite serving as a precursor. That is, when the content is increased, the doping amount of transition metal ion is increased. When the content is decreased, the doping amount is decreased. By using a polymer complex including a different transition metal ion together, titanium oxide can be doped with multiple types of transition metal ions.

By performing doping with the transition metal ion in such a manner, it is confirmed that the lattice constant of the rutile-type titanium oxide crystal is different from that of a pure rutile-type titanium oxide crystal. That is, as described above, a decrease or increase in the lattice constant means the generation of distortion.

The obtained rutile-type titanium oxide crystal is normally in the form of powder. By directly dispersing the rutile-type titanium oxide crystal in a sol of a metal alkoxy compound or by dispersing the rutile-type titanium oxide crystal pulverized in advance in a sol of a metal alkoxy compound, a fluid liquid composition is obtained. This fluid liquid composition can be applied onto a substrate to produce a thin film.

The particle size of the powder above is normally several micrometers, but can be easily adjusted to 100 nm or less by a pulverizing/dispersion method that uses a mill, Despa, or a mortar. Such powder having a small particle size of 100 nm or less is preferably used for infrared absorbing thin films because the density of a film can be improved and the heat-generating effect due to infrared absorption can be improved.

When the rutile-type titanium oxide crystal is dispersed in a sol of a metal alkoxide, such dispersion is performed on the basis of a metal oxide (assumed that the reaction completely proceeds) formed in the sol of a metal alkoxide. The mass ratio of (powder composed of rutile-type titanium oxide crystal)/(metal oxide formed of metal alkoxide) is preferably 90/10 to 99/1. The mass ratio is preferably 95/5 to 98/2 to achieve a good balance between efficient infrared absorption of a thin film obtained from the fluid liquid composition, the infrared absorption being realized by eliminating the transmission of infrared rays, and the adhesion of the thin film to a substrate.

The metal alkoxide is not limited as long as a metal oxide is obtained through a decomposition reaction of the metal alkoxide at room temperature or by heating. Examples of the metal alkoxide include alkoxides of titanium, zirconium, and silicon. Examples of the specific compound include tetrabutoxy titanium, tetrapropoxy titanium, tetraisobutoxy titanium, tetraisopropoxy titanium, titanium lactate, titanium bis(lactate), titanium ethylacetoacetate, tetrabutoxy zirconium, and tetraethoxy silane.

The sol can be prepared by dispersing the metal alkoxide in water, ethanol, isopropanol, butanol, ethylene glycol, or the like. These solvents may be used alone or in combination of two or more.

A dispersion liquid of nanoparticles of a metal oxide can be used as the sol of a metal oxide. For example, titanium oxide nanoparticles having a particle size of 5 to 30 nm can be used for a dispersion liquid of titanium oxide nanoparticles. A dispersion liquid of nanoparticles of zirconium oxide, aluminum oxide, zinc oxide, or the like can also be used. Herein, the mass ratio of (powder composed of rutile-type titanium oxide crystal)/(metal oxide in the form of nanoparticles) is preferably 90/10 to 99/1. The mass ratio is preferably 95/5 to 98/2 to achieve a good balance between efficient infrared absorption of a thin film obtained from the fluid liquid composition, the infrared absorption being realized by eliminating the transmission of infrared rays, and the adhesion of the thin film to a substrate.

The solid content in the fluid liquid composition prepared above is preferably 30 to 90% by mass because the fluid liquid composition is easily applied onto a substrate and the thickness is easily decreased after the application.

A method for applying the fluid liquid composition onto a substrate is not particularly limited. For example, a method using a bar coater, a spin coater, an applicator, or a roll coater, dipping, and spraying can be employed. The substrate used herein can be suitably selected in accordance with the usage of the infrared absorbing thin film of the present invention. Examples of a material of the substrate include a metal, a metal oxide, silicon, ceramic, glass, and plastic.

After the application onto the substrate, the coating film can be aged (hardened) by being dried at room temperature or by heating to produce the infrared absorbing thin film of the present invention. Heating is preferably performed to improve the adhesion to the substrate, and the temperature can be adjusted in accordance with the properties of the substrate used. For example, in the case of a substrate having high heat resistance, such as a substrate composed of a metal or a metal oxide, the coating film can be aged (hardened) by being heated to a maximum temperature of 1200° C. In the case of a substrate having low heat resistance, such as a substrate composed of plastic, the heating is preferably performed at about 250° C. in consideration of its material.

Raw materials used in the production method of the present invention will now be described.

[Polymer (x)]

The amino group-containing basic polymer (x) used in the present invention is not particularly limited, and typical water-soluble polyamines can be used.

Examples of a synthetic polyamine serving as the polymer (x) include synthetic polyamines having an amino group on its side chain or main chain, such as polyvinylamine, polyallylamine, polyethyleneimine (branched and straight chain), polypropyleneimine, poly(4-vinylpyridine), poly(aminoethyl methacrylate), and poly[4-(N,N-dimethylaminomethylstyrene)]. Among them, polyethyleneimine is particularly preferred because it is easily available and can easily form a layered structure with a titanium oxide sol.

Examples of a biogenic polyamine include chitin, chitosan, spermidine, bis(3-aminopropyl)amine, homospermidine, and spermine. Examples of a biogenic polymer having a large number of basic amino acid residues include biogenic polyamines, e.g., synthetic polypeptides such as polylysine, polyhistidine, and polyarginine.

The polymer (x) may be a modified polyamine obtained by bonding some of amino groups in a polyamine to a non-amine polymer skeleton or a copolymer of a polyamine skeleton and a non-amine polymer skeleton. The modified polyamine and the copolymer can be easily produced by causing the amino group of the amino group-containing basic polymer (x) to react with a compound having a functional group that can easily react with an amine, such as an epoxy group, a halogen, a tosyl group, or an ester group.

The non-amine polymer skeleton may be hydrophilic or hydrophobic. Examples of a hydrophilic polymer skeleton include skeletons of polyethylene glycol, polymethyloxazoline, polyethyloxazoline, and polyacrylamide. Examples of a hydrophobic polymer skeleton include skeletons of epoxy resin, urethane resin, and polymethacrylate resin. In the case where the polymer (x) has a structural unit having no amino group, the ratio of the non-amine polymer skeleton in all structural units of the polymer (x) is preferably 50% or less by mass, more preferably 20% or less by mass, and particularly preferably 10% or less by mass to achieve good dispersion state of the polymer (x) in water and to effectively facilitate the hydrolysis or dehydration condensation reaction of a water-soluble titanium compound (z) described below.

The molecular weight of the polymer (x) is not particularly limited. The weight-average molecular weight, which is a polystyrene equivalent value determined by gel permeation chromatography (GPC), is normally 300 to 100000, preferably 500 to 80000, and more preferably 1000 to 50000.

[Complex (y) of Polymer/Transition Metal Ion]

The complex (y), of the amino group-containing basic polymer (x) and the transition metal ion, used in the production method of the present invention is obtained by adding a transition metal ion to the amino group-containing basic polymer (x). The complex (y) is formed through a coordinate bond between the transition metal ion and the amino group in the polymer (x).

The transition metal ion used herein is the same as the transition metal ion in the rutile-type titanium oxide crystal to be obtained, and any transition metal ion that can form a coordinate bond with an amino group can be used. In terms of the ionic valence of the transition metal ion, monovalent to tetravalent metal salts may be used, and the metal salts can be preferably used even in a complex ion state. Among them, an ion of iron, zinc, manganese, copper, cobalt, vanadium, tungsten, or nickel is preferably used because such an ion is easily available and provides a rutile-type titanium oxide crystal having high transmittance of mid-infrared rays.

The amount of the transition metal ion used is preferably 1/2 to 1/500 equivalents on an ion basis relative to the number of Moles of the amino group in the amino group-containing basic polymer (x).

[Water-Soluble Titanium Compound (z)]

The titanium compound used in the present invention is soluble in water, and does not hydrolyze when being dissolved in water. That is, the titanium compound is preferably a non-halogen titanium compound that is stable in pure water. Specific examples of the titanium compound include an aqueous titanium bis(ammonium lactato)dihydroxide solution, an aqueous titanium bis(lactate) solution, a propanol/water mixed solution of titanium bis(lactate), and titanium (ethyl acetoacetate) diisopropoxide.

[Composite having Polymer/Titania Layered Structure]

The composite having a polymer/titania layered structure can be produced by adding the water-soluble titanium compound (z) to an aqueous solution of the complex (y) of the amino group-containing basic polymer (x) and the metal ion.

When the amount of the water-soluble titanium compound (z) serving as a titanium source is excessively large relative to the amount of the amine unit in the complex (y) of the amino group-containing basic polymer (x) and the metal ion, the composite can be suitably formed. Specifically, the amount of the water-soluble titanium compound (z) is preferably 2 to 1000 times and particularly preferably 4 to 700 times the equivalent amount of the amine unit.

The concentration of the aqueous solution of the complex (y) of the amino group-containing basic polymer (x) and the transition metal ion is preferably 0.1 to 30% by mass based on the amount of the polyamine contained in the polymer (x).

The time required for the hydrolytic condensation reaction of the water-soluble titanium compound (z) can be set in the range from one minute to several hours. The reaction time is preferably set in the range from 30 minutes to 5 hours to increase the reaction efficiency.

The pH value of the aqueous solution in the hydrolytic condensation reaction is preferably set in the range of 5 to 11 and is particularly preferably set in the range of 7 to 10.

A composite obtained through the hydrolytic condensation reaction in the presence of the complex (y) of the amino group-containing basic polymer (x) and the transition metal ion is a colored precipitate having a color of the transition metal ion.

The content of titania in the composite (precursor) produced through the hydrolytic condensation reaction can be adjusted by controlling the reaction conditions or the like, and a composite containing 20 to 90% by mass of titania can be obtained. The thus-obtained composite is calcined by the above-described method, whereby the rutile-type titanium oxide crystal can be produced.

The rutile-type titanium oxide crystal used in the present invention is a rutile-type titanium oxide crystal that is doped with a transition metal ion. The form is amorphous powder, which is powder of a polycrystal with a crystallite size of 20 to 100 nm.

The doping amount of the transition metal ion into the titanium oxide is normally 0.05 to 20% by mass and preferably 0.1 to 20% by mass to broaden the infrared absorption wavelength range.

One or more types of transition metal ions may be used for doping. The half-width of a transmission peak and the height of the peak can be adjusted by controlling a mixed doping state.

In the present invention, a rutile-type crystal is an essential factor to improve the absorption of infrared rays over a wide infrared wavelength range. A complete rutile-type crystal phase is desired as a crystal phase. However, the titanium oxide crystal may contain a certain amount of anatase-type crystal phase. In this case, the ratio of the anatase-type crystal phase is preferably 30% or less by mass.

The powder of the rutile-type titanium oxide crystal used in the present invention can be lightly colored by controlling the doping amount of transition metal ion and the type of transition metal ion.

The particle size of the powder above is normally several micrometers, but can be easily adjusted to 100 nm or less by a pulverizing/dispersion method that uses a mill, Despa, or a mortar.

The infrared absorbing thin film produced in the present invention is characterized in that the thin film absorbs infrared rays and the surface of the thin film generates heat. For example, even if low power infrared rays are used, by performing irradiation with infrared rays having a wavelength of 2 to 20 μm for about several seconds to one minute, the surface temperature can be increased to 70° C. or higher. When the power of a light source is high, the temperature can be easily increased to higher than 100° C. In fact, when the infrared absorbing thin film of the present invention is formed on a plastic film and the plastic film is irradiated with infrared rays, the plastic film can be deformed. Such a sudden heat-generating phenomenon is not observed in a titanium oxide crystal that is not doped with a metal ion.

Accordingly, the infrared absorbing thin film of the present invention can be used in various fields as various heat sources that convert light energy into thermal energy.

EXAMPLES

The present invention will now be further described in detail based on Examples. Note that "%" and "part" represent "% by mass" and "part by mass", respectively, unless otherwise specified.

[Analysis of Titanium Oxide by X-Ray Diffraction (XRD)]

Titanium oxide was placed on a sample holder and the sample holder was set in Wide-angle X-ray Diffractometer "Rint-ultma" manufactured by Rigaku Corporation. The measurement was performed using a Cu/Ka X-ray at 40 kV/30 mA at a scanning speed of 1.0°/min in a scanning range of 20 to 40°. In particular, in the detailed analysis of the internal structure of a coating film, the measurement was performed using a Cu/Ka X-ray at 50 kV/300 mA at a scanning speed of 0.12°/min with a scanning axis of 2θ (incident angle: 0.2 to 0.5°, 1.0°.

[Infrared Transmission Spectrum]

Infrared transmission was measured using Fourier transform infrared spectrometer "Spectrum One Image System FT-IR Spectrometer" manufactured by PerkinElmer, Inc.

[X-Ray Fluorescence Analysis]

X-ray fluorescence analysis was performed under the vacuum condition using ZSX manufactured by Rigaku Corporation.

Example 1

Film Containing 1-Ti—Mn 50 Doped with Manganese Ion

[Synthesis of Titanium oxide 1-Ti—Mn 50 Doped with Manganese Ion]

Figure 1:
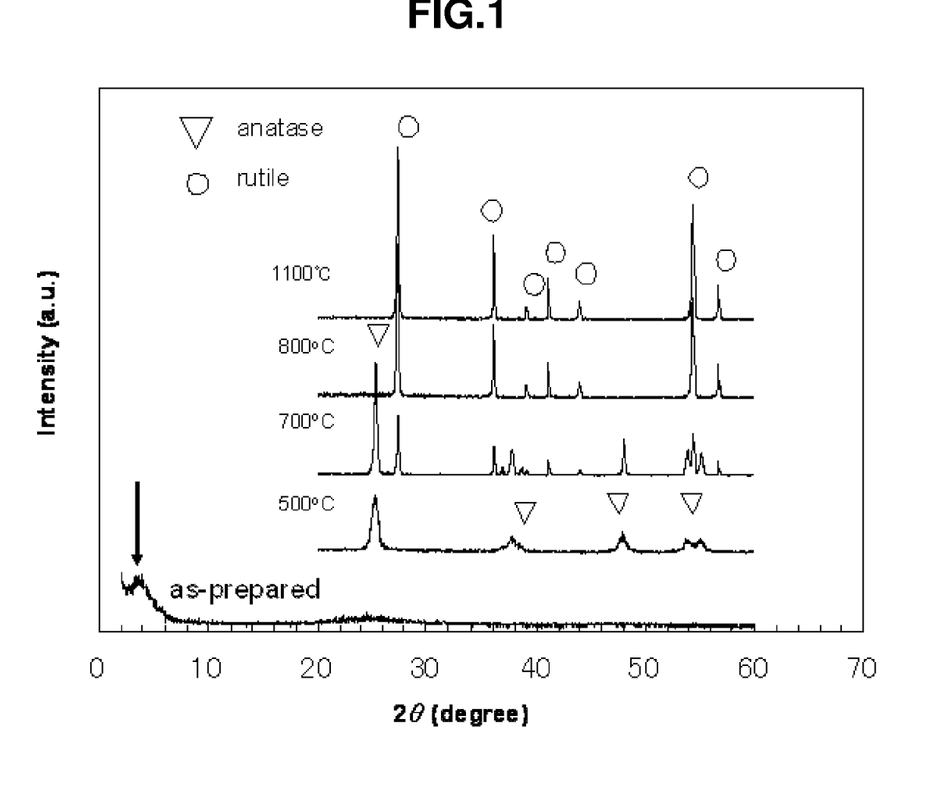
FIG. 1 shows XRD diffraction patterns of a precursor and manganese ion doped titanium oxides after calcination obtained in Example 1. A precursor before calcination, a sample calcined at 500° C., a sample calcined at 700° C., a sample calcined at 800° C., and a sample calcined at 1100° C. are shown from the bottom in that order.

To prepare a complex solution of polyethylimine/manganese ion (A solution, molar ratio of imine/Mn: 50), 9 ml of 0.1 M Mn(NO3)2 was added to 100 ml of 2 wt % polyethylimine (SP 200 manufactured by NIPPON SHOKUBAI CO., LTD., molecular weight: 10000). In addition, 28% ammonia water was added dropwise to a titanium lactate solution (TC 310 manufactured by Matsumoto Pharmaceutical Manufacture Co., Ltd., 20 vol %) to prepare an aqueous solution (B solution) having a pH value of 9. Ten milliliters of A solution was slowly added dropwise to 100 ml of B solution at room temperature (25° C.) under stirring. After about one hour, a large amount of precipitate was produced from the mixed solution. The precipitate was filtered, washed with water, and then dried at room temperature to obtain 8.9 g of light yellow powder (precursor). In the XRD pattern of the precursor powder, a strong X-ray diffraction peak that indicates a layered structure appeared on the low angle side (2θ, about)3.7° (FIG. 1). In other words, the precursor was a composite having a layered structure that was formed of titanium oxide and a polymer metal complex.

Two grams of the precursor was inserted into an alumina crucible and calcined in the air atmosphere at different temperatures (500, 700, 800, and 1100° C.) for 3 hours to obtain a yellow powder. It was confirmed from the XRD pattern of the yellow powder that the diffraction peak at the low angle side was completely eliminated (FIG. 1). In the calcination at 500° C., only an anatase-type crystal phase was formed. In the calcination at 700° C., the presence of rutile-type and anatase-type crystal phases was confirmed. In the calcination at a higher temperature of 800° C. or 1100° C., only a rutile-type crystal phase was formed. As a result of the ultimate analysis of the powder (1-Ti—Mn 50) after the calcination at 800° C. with fluorescence X-rays, 1.8% MnO was confirmed to be contained in 1-Ti—Mn 50. This means that titanium oxide obtained by performing calcination in the air atmosphere was doped with a manganese ion.

From the analysis of a crystal lattice of the crystal powder by WPF, the lattice constants a and b were 4.58963 (Å) and the lattice constant c was 2.95778 (Å). This shows that the lattice constants were decreased compared with those of a standard rutile-type titanium oxide crystal whose lattice constants a and b are 4.59287 (Å) and lattice constant c is 2.95074 (Å). That is, the unit size of the rutile-type crystal phase was decreased by performing doping with a manganese ion.

Figure 2:
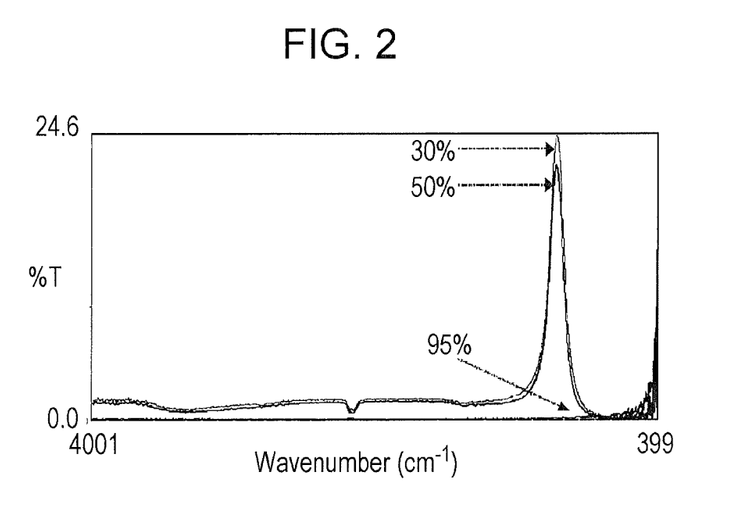
FIG. 2 shows FT-IR spectra of a doped titanium oxide calcined at 800° C. in Example 1. Samples containing 95 wt % of doped titanium oxide, 50 wt % of doped titanium oxide, and 30 wt % of doped titanium oxide in a KBr plate are shown from the bottom in that order.

The obtained 1-Ti—Mn 50 powder was mixed with KBr and ground using a mortar. Subsequently, plates were prepared so that the content of 1-Ti—Mn 50 in KBR was 30 wt %, 50 wt %, and 95 wt %. The plates were used for FT-IR measurement. FIG. 2 shows the FT-IR transmission spectra of the plates. Even in the plate containing 50 wt % of 1-Ti—Mn 50 powder in KBr, infrared rays were absorbed on near-infrared and far-infrared sides, and the IR transmitting property was seen only in a particular wavenumber range of mid-infrared rays (wavelength: 6.8 to 13 μm). The transmittance herein was 24% or less. In the plate containing 95% of 1-Ti—Mn 50 powder, no transmission was observed and absorption was confirmed over the entire wavelength range. This clearly means that a plate containing a small amount of 1-Ti—Mn 50 functions as an infrared filter that efficiently transmits mid-infrared rays whereas a plate containing a large amount of 1-Ti—Mn 50 can absorb even mid-infrared rays.

[Production of Thin Film]

Figure 3:
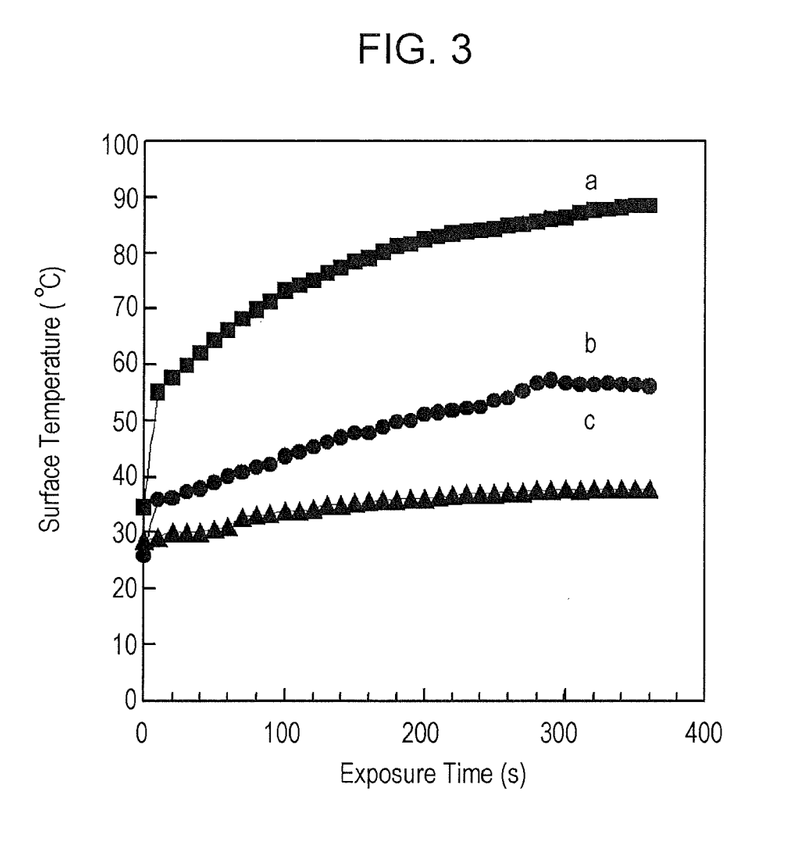
FIG. 3 shows a change in surface temperature of a coating film prepared in Example 1 as a function of irradiation time when the coating film is irradiated with infrared rays. (a) a sample calcined at 800° C., (b) a rutile-type titanium oxide without doping, and (c) silicon.

The obtained 1-Ti—Mn 50 powder was ground using a mortar. By observing the powder with a SEM, it was confirmed that the powder was an amorphous powder and had a particle size of 70 to 90 nm. Subsequently, 0.5 g of the powder was weighed and mixed with 2 mL of a toluene solution of 10 vol % tetrabutoxy titanium. The mixed solution was applied onto a silicon plate by a casting method. The coating film was left to stand at room temperature for three hours and then left to stand at a high temperature of 1000° C. for one hour. Thus, a film having a thickness of 1 mm was prepared. This film was irradiated with infrared rays using ceramic infrared radiation equipment (Kokaratto manufactured by TPR Co., Ltd., 200 W). At a room temperature of 10° C., an increase in the surface temperature of the film as a function of infrared irradiation time was measured using a noncontact surface thermometer (manufactured by Anritsu Meter Co., Ltd.). FIG. 3a shows the result. At an irradiation time of 10 seconds, the surface temperature of the film was increased to nearly 60° C. After that, as the irradiation time elapsed, the surface temperature of the film was increased to nearly 90° C. Furthermore, when a drop of ethanol was dripped onto the surface of the film whose surface temperature was increased to 90° C., the ethanol was vaporized in a boiling manner.

For comparison, a film was produced in the same manner as above using a rutile-type titanium oxide crystal that was not doped with a metal, and the same experiment as above was performed. Even when the infrared irradiation time was increased, the temperature was increased to only about 50° C. (FIG. 3b). In a silicon substrate without such a film, an increase in temperature caused by infrared irradiation basically did not occur (FIG. 3c).

Example 2

Film Containing 2-Ti—Mn 200 Doped with Manganese Ion

[Synthesis of Titanium Oxide 2-Ti—Mn 200 Doped with Manganese Ion]

Figure 4:
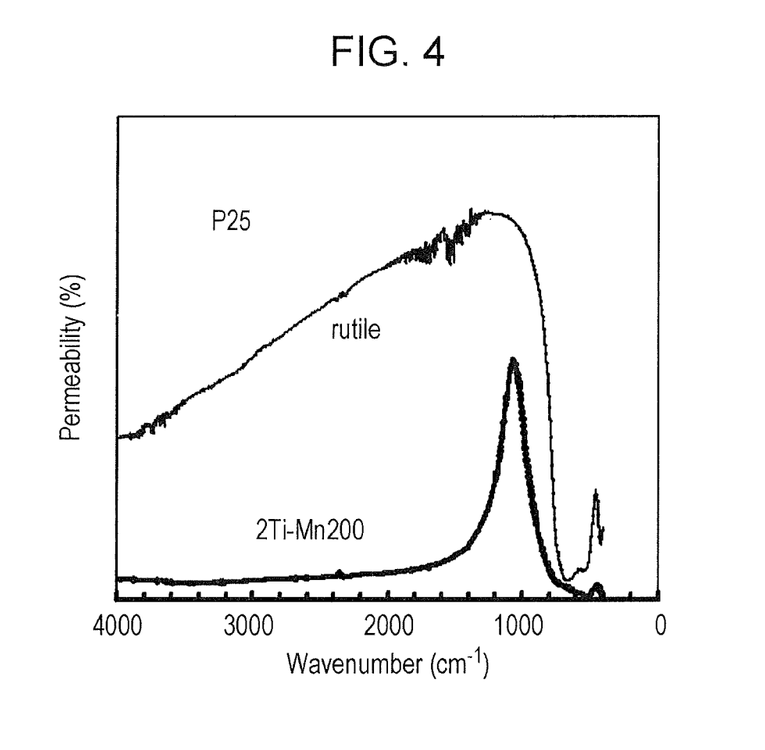
FIG. 4 shows FT-IR spectra of a titanium oxide doped with manganese and prepared in Example 2 and comparative samples. A titanium oxide doped with manganese, a rutile-type titanium oxide, and a commercially available titanium oxide (P25) sample are shown from the bottom in that order.

A rutile-type titanium oxide crystal doped with manganese was produced by performing doping under the same conditions as those of Example 1, except that the molar ratio of ethyleneimine/manganese ion in Example 1 was changed to 1/200. A KBr plate containing 20 wt % of the crystal powder was prepared and then subjected to FT-IR measurement. For comparison, a KBr plate containing 20 wt % of commercially available titanium oxide degusa P25 (mixed crystal of anatase-type and rutile-type crystal phases) and a KBr plate containing 20 wt % of a rutile-type titanium oxide crystal were subjected to FT-IR measurement. As shown in FIG. 4, the KBr plate containing 2-Ti—Mn 200 did not transmit infrared rays in a range other than a mid-infrared wavelength range. The plate containing the undoped rutile-type titanium oxide crystal or the commercially available titanium oxide (P25) for comparison had weak infrared absorption and tends to transmit infrared rays over the entire wavelength range.

[Production of Thin Film]

A film was produced by the same method as that of Example 1. The film was irradiated with infrared rays for 100 seconds. As a result of the measurement of the temperature, the surface temperature of the film was increased to 70° C.

Example 3

Film Containing Titanium Oxide Doped with Manganese Ion

A rutile-type titanium oxide crystal doped with a manganese ion was obtained by performing the synthesis of a precursor and the calcination in the air atmosphere (800° C.) under the same conditions as those of Example 1, except that the molar ratio of ethyleneimine/manganese in Example 1 was changed to 1/2, 1/5, and 1/10. Table 1 shows three titanium oxides having different manganese doping amounts (the manganese ion content is an equivalent value on a MnO basis).

TABLE 1

| Sample name | Ti—Mn 2 | Ti—Mn 5 | Ti—Mn 10 |
|---|---|---|---|
| MnO content measured by X-ray fluorescence analysis (%) | 26 | 19.8 | 12.9 |

Figure 5:
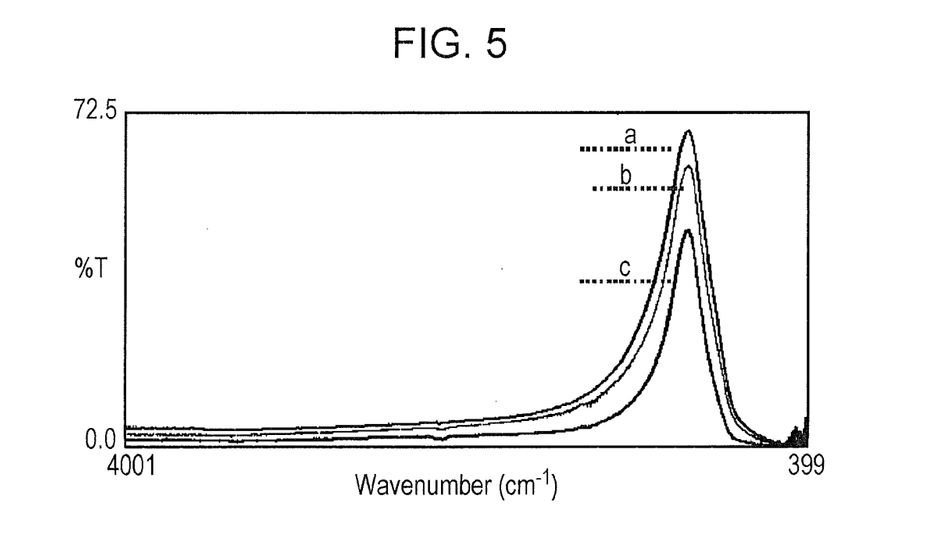
FIG. 5 shows FT-IR spectra of titanium oxide samples doped with manganese and prepared in Example 3. (a) Ti—Mn 5, (b) Ti—Mn 10, and (c) Ti—Mn 2.

In the XRD measurement of these titanium oxides, a diffraction pattern derived from MnO appeared in addition to that derived from a rutile-type titanium oxide crystal. In particular, as the MnO content reached 20%, a crystal derived from $Mn_2O_3$ was observed as manganese oxide. A plate was prepared by adding 10 wt % of a titanium oxide crystal containing such a large amount of manganese to KBr and then subjected to FT-IR measurement. As shown in FIG. 5, all the samples transmitted only infrared rays in a narrow range of mid-infrared wavelengths and absorbed infrared rays in almost the entire wavelength range.

Films were produced by the same method as that of Example 1 using these rutile-type titanium oxide crystals doped with manganese, and an increase in the temperature of the films during infrared irradiation was measured. In all the films, the temperature was increased to higher than 70° C. at an irradiation time of 150 seconds.

Example 4

Film Containing Titanium Oxide Doped with Cobalt Ion

[Synthesis of Titanium Oxide Doped with Cobalt Ion]

A rutile-type titanium oxide crystal doped with a nickel cobalt ion was obtained by performing the synthesis of a precursor and the calcination in the air atmosphere (800° C.) under the same conditions as those of Example 1, except that cobalt nitrate was used instead of $Mn(NO_3)_2$ in Example 1 (the molar ratio of ethyleneimine/Co was 1/2, 1/5, and 1/10 in a polymer/metal complex). Table 2 shows three titanium oxides having different cobalt doping amounts (the cobalt ion content is an equivalent value on a $Co_2O_3$ basis).

TABLE 2

| Sample name | Ti—Co 2 | Ti—Co 5 | Ti—Co 10 |
|---|---|---|---|
| $Co_2O_3$ content measured by X-ray fluorescence analysis (%) | 33.5 | 25.7 | 15.6 |

Figure 6:
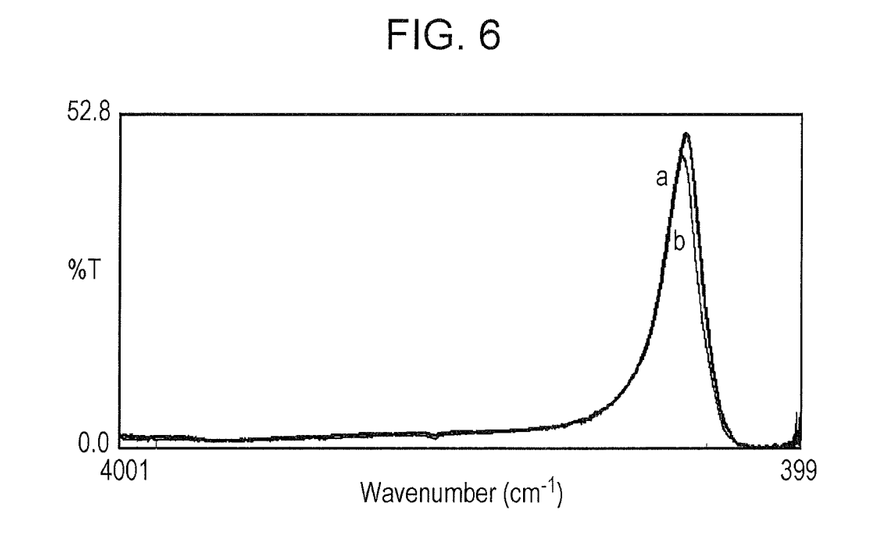
FIG. 6 shows FT-IR spectra of titanium oxide samples doped with cobalt and prepared in Example 4. (a) Ti—Co 2 and (b) Ti—Co 5.

It was confirmed from XRD measurement that these three titanium oxide crystals were crystals that agree with a rutile-type crystal. Furthermore, a crystal corresponds to $CoTiO_3$ was confirmed in addition to the rutile-type titanium oxide crystal. As a result of the FT-IR measurement of the samples (10% in KBr), all the samples did not transmit infrared rays in a wavelength range other than mid-infrared wavelength range (FIG. 6). Films were produced under the same conditions as those of Example 1 using these samples, and an increase in the temperature of the films during infrared irradiation was measured. The surface temperature of each of the films was increased to higher than 70° C. at an irradiation time of 150 seconds.

Example 5

Film Containing Titanium Oxide Doped with Nickel Ion

[Synthesis of Titanium Oxide Doped with Nickel Ion]

Figure 7:
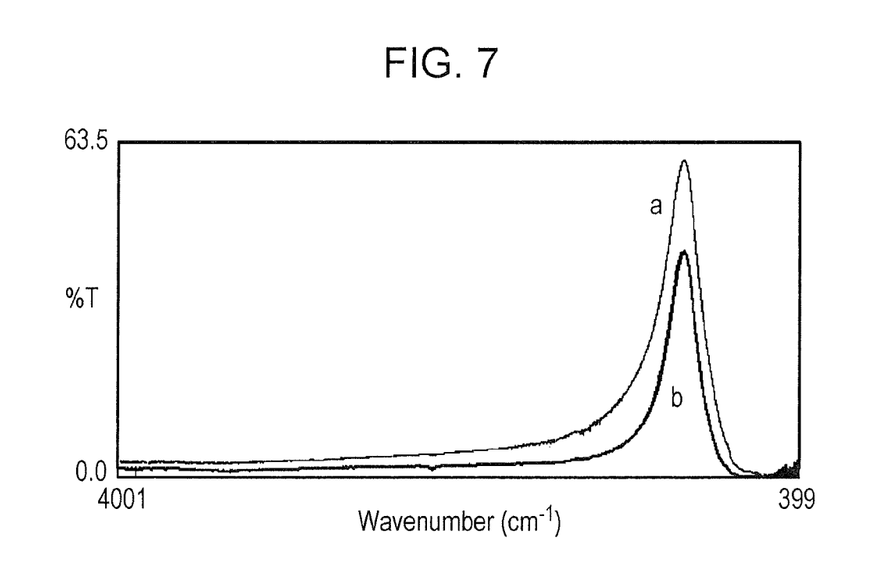
FIG. 7 shows FT-IR spectra of titanium oxide samples doped with nickel and prepared in Example 5. (a) Ti—Ni 2 and (b) Ti—Ni 5.

A rutile-type titanium oxide crystal doped with a nickel ion was obtained by performing the synthesis of a precursor and the calcination in the air atmosphere (800° C.) under the same conditions as those of Example 1, except that nickel nitrate was used instead of $Mn(NO_3)_2$ in Example 1 (the molar ratio of ethyleneimine/Ni was 1/2, 1/5, and 1/10 in a polymer/metal complex). Table 3 shows three titanium oxides having different nickel doping amounts (the nickel ion content is an equivalent value on a NiO basis). It was confirmed from XRD measurement that these three titanium oxide crystals were crystals that agree with a rutile-type crystal. Furthermore, a crystal corresponds to $NiTiO_3$ was confirmed in addition to the rutile-type titanium oxide crystal. As a result of the FT-IR measurement of the samples (10% in KBr), all the samples did not transmit infrared rays in a wavelength range other than mid-infrared wavelength range (FIG. 7). Films were produced under the same conditions as those of Example 1 using these samples, and an increase in the temperature of the films during infrared irradiation was measured. The surface temperature of each of the films was increased to higher than 70° C. at an irradiation time of 150 seconds.

TABLE 3

| Sample name | Ti—Ni 2 | Ti—Ni 5 | Ti—Ni 10 |
|---|---|---|---|
| NiO content measured by X-ray fluorescence analysis (%) | 30.3 | 24.5 | 14.9 |

The invention claimed is:

1. A method for producing an infrared absorbing thin film containing a rutile-type titanium oxide crystal doped with a transition metal ion selected from the group consisting of iron, zinc, manganese, copper, cobalt, vanadium, tungsten, and nickel, the method comprising:
    a step (I) of dispersing or dissolving a complex (y) of an amino group-containing basic polymer (x) and a transition metal ion selected from the group consisting of iron, zinc, manganese, copper, cobalt, vanadium, tungsten, and nickel in an aqueous medium;
    a step (II) of obtaining a composite having a polymer/titania layered structure in which the complex (y) of the amino group-containing basic polymer (x) and the transition metal ion is sandwiched between layers of titania with a distance of 1 to 3 nm, by mixing the aqueous dispersion or aqueous solution prepared in the step (I) with a water-soluble titanium compound (z) in the aqueous medium at a temperature of 50° C. or lower to cause a hydrolysis reaction;
    a step (III) of calcining the composite having the layered structure in an air atmosphere at a temperature of 650° C. or higher to dope a surface of a titanium oxide crystal with the transition metal ion confined in the layered structure and simultaneously to cause growth into a rutile-type crystal phase;

a step (IV) of pulverizing the obtained crystal into a powder;

a step (V) of mixing the obtained powder with a sol of a metal alkoxide and/or a dispersion liquid of metal oxide nanoparticles to prepare a fluid liquid composition;

a step (VI) of coating a surface of a substrate with the obtained fluid liquid composition; and a step (VII) of aging the coating film.

2. The method for producing an infrared absorbing thin film according to claim 1, wherein the content of the transition metal ion with which the rutile-type titanium oxide crystal is doped is 0.1 to 20% by mass.

3. The method for producing an infrared absorbing thin film according to claim 1, wherein, in the step (IV), the rutile-type titanium oxide crystal doped with the transition metal ion is pulverized into a powder having a particle size of 100 nm or less.

4. The method for producing an infrared absorbing thin film according to claim 1, wherein the metal alkoxide used in the step (V) is an alkoxide of at least one metal selected from the group consisting of titanium, zirconium, and silicon.

5. The method for producing an infrared absorbing thin film according to claim 1, wherein, in the step (V), the mixing ratio of the powder composed of the rutile-type titanium oxide crystal doped with the transition metal ion relative to the sol of a metal alkoxide and/or the dispersion liquid of metal oxide nanoparticles ((powder composed of rutile-type titanium oxide crystal)/(metal oxide formed of metal alkoxide and/or metal oxide in the form of nanoparticles)) is 95/5 to 98/2 on a mass basis.

6. The method for producing an infrared absorbing thin film according to claim 1, wherein, in the step (V), the fluid liquid composition is prepared so as to have a solid content of 30 to 90% by mass.

7. An infrared absorbing thin film which is an infrared absorbing film obtained by the production method according to claim 1, wherein the infrared absorbing film contains 90% or more by mass of the rutile-type titanium oxide crystal doped with the transition metal ion.

8. The infrared absorbing thin film according to claim 7, wherein the infrared absorbing film absorbs infrared rays and then a surface of the infrared absorbing film generates heat.

9. The method for producing an infrared absorbing thin film according to claim 1, wherein, in the step (V), the fluid liquid composition is prepared so as to have a solid content of 30 to 90% by mass.

10. The method for producing an infrared absorbing thin film according to claim 2, wherein, in the step (V), the fluid liquid composition is prepared so as to have a solid content of 30 to 90% by mass.

11. The method for producing an infrared absorbing thin film according to claim 3, wherein, in the step (V), the fluid liquid composition is prepared so as to have a solid content of 30 to 90% by mass.

12. The method for producing an infrared absorbing thin film according to claim 4, wherein, in the step (V), the fluid liquid composition is prepared so as to have a solid content of 30 to 90% by mass.

13. The method for producing an infrared absorbing thin film according to claim 5, wherein, in the step (V), the fluid liquid composition is prepared so as to have a solid content of 30 to 90% by mass.

14. An infrared absorbing thin film which is an infrared absorbing film obtained by the production method according to claim 1, wherein the infrared absorbing film contains 90% or more by mass of the rutile-type titanium oxide crystal doped with the transition metal ion.

15. An infrared absorbing thin film which is an infrared absorbing film obtained by the production method according to claim 2, wherein the infrared absorbing film contains 90% or more by mass of the rutile-type titanium oxide crystal doped with the transition metal ion.

16. An infrared absorbing thin film which is an infrared absorbing film obtained by the production method according to claim 3, wherein the infrared absorbing film contains 90% or more by mass of the rutile-type titanium oxide crystal doped with the transition metal ion.

17. An infrared absorbing thin film which is an infrared absorbing film obtained by the production method according to claim 4, wherein the infrared absorbing film contains 90% or more by mass of the rutile-type titanium oxide crystal doped with the transition metal ion.

18. An infrared absorbing thin film which is an infrared absorbing film obtained by the production method according to claim 5, wherein the infrared absorbing film contains 90% or more by mass of the rutile-type titanium oxide crystal doped with the transition metal ion.

19. The infrared absorbing thin film according to claim 14, wherein the infrared absorbing film absorbs infrared rays and then a surface of the infrared absorbing film generates heat.

* * * * *